US012703007B2

United States Patent

(12) Gilbert

(10) Patent No.: US 12,703,007 B2

(45) Date of Patent: Aug. 11, 2026

(54) SYSTEMS AND METHODS FOR LARGE DEBRIS CONVEYANCE

(71) Applicant: Steve L. Gilbert, Toquerville, UT (US)

(72) Inventor: Steve L. Gilbert, Toquerville, UT (US)

(*) Notice: Subject to any disclaimer, the term of this patent is extended or adjusted under 35 U.S.C. 154(b) by 0 days.

(21) Appl. No.: 18/607,980

(22) Filed: Mar. 18, 2024

(65) Prior Publication Data

US 2024/0216954 A1 Jul. 4, 2024

Related U.S. Application Data

(63) Continuation of application No. 17/536,686, filed on Nov. 29, 2021, now Pat. No. 11,931,778, which is a continuation of application No. 16/993,861, filed on Aug. 14, 2020, now Pat. No. 11,185,888, which is a continuation of application No. 16/551,044, filed on Aug. 26, 2019, now Pat. No. 10,744,533, which is a continuation of application No. 15/663,060, filed on Jul. 28, 2017, now Pat. No. 10,391,521.

(60) Provisional application No. 62/368,495, filed on Jul. 29, 2016.

(51) Int. Cl.

| | |
|---|---|
| ***B07B 1/00*** | (2006.01) |
| ***B07B 15/00*** | (2006.01) |
| ***B65G 41/00*** | (2006.01) |
| ***E02F 5/22*** | (2006.01) |
| *B02C 21/02* | (2006.01) |

(52) U.S. Cl.

CPC .............. *B07B 1/005* (2013.01); *B07B 15/00* (2013.01); *B65G 41/002* (2013.01); *B65G 41/008* (2013.01); *E02F 5/226* (2013.01); *B02C 21/02* (2013.01)

(58) Field of Classification Search

CPC ....... B07B 1/005; B07B 15/00; B65G 41/002; B65G 41/008

USPC .......................................................... 209/421

See application file for complete search history.

(56) References Cited

U.S. PATENT DOCUMENTS 2,164,796 A * 7/1939 Bird ........................ G01G 11/08 209/44

2,796,717 A * 6/1957 Orelind ................ A01D 75/285 180/41

3,209,911 A 10/1965 Speno et al.

3,249,026 A * 5/1966 Curlett .................... E02F 3/841 404/84.2

3,316,977 A 5/1967 Snook (Continued)

FOREIGN PATENT DOCUMENTS

CN 104084296 10/2014

EP 0150080 7/1985

(Continued)

*Primary Examiner* — Terrell H Matthews

(74) *Attorney, Agent, or Firm* — Ray Quinney & Nebeker P.C.; Paul N. Taylor

(57) ABSTRACT

A device for sorting particulate material includes a main conveyor belt, a separation screen, a graded material conveyor, and an oversize material conveyor. The separation screen is configured to separate the material into a first portion and a second portion with a larger average particle diameter than the first portion. The graded material conveyor is positioned below the separation screen to receive the first portion of the material, and the oversize material conveyor is positioned at an end of the separation screen to receive the second portion of the material.

20 Claims, 13 Drawing Sheets

(56) References Cited

U.S. PATENT DOCUMENTS 3,612,246 A 10/1971 Uffeln et al.
3,863,783 A * 2/1975 Spellman, Jr. ........ B28C 5/4255 198/312
3,892,443 A 7/1975 Arentzen
4,067,676 A * 1/1978 Hewitt .................. B28B 23/046 404/100
4,128,049 A 12/1978 Lehmacher
4,861,461 A * 8/1989 Utterback ............... B07B 1/005 209/241
4,948,299 A * 8/1990 Cronk, Jr. ................. E02F 5/14 198/522
5,394,976 A 3/1995 Dowden
5,430,962 A 7/1995 Osadchuk
5,588,534 A * 12/1996 Harel ........................ B03B 9/06 209/636
5,988,937 A 11/1999 Komoriya et al.
6,186,338 B1 * 2/2001 Douglas .................. B02C 21/02 209/244
6,318,930 B1 11/2001 Scudder
8,002,116 B1 8/2011 Cato
2004/0031662 A1 * 2/2004 Jacoba Dekoning ........................ B65G 41/005 198/313
2004/0211092 A1 * 10/2004 Barnes ...................... E02F 7/02 37/142.5
2008/0128333 A1 6/2008 Smith et al.
2009/0084710 A1 4/2009 Aman
2010/0018908 A1 1/2010 Lewis
2011/0073529 A1 * 3/2011 Sprouse .................... B03C 1/08 209/225
2016/0114982 A1 * 4/2016 Lichtberger ......... B65G 41/008 198/315
2016/0176647 A1 * 6/2016 Salminen ............... B65G 21/12 241/24.1

FOREIGN PATENT DOCUMENTS

GB 337740 11/1930
WO WO1990/010752 9/1990

* cited by examiner

SYSTEMS AND METHODS FOR LARGE DEBRIS CONVEYANCE

CROSS-REFERENCE TO RELATED APPLICATIONS

This application is a continuation of U.S. patent application Ser. No. 17/536,686, filed Nov. 29, 2021, which is a continuation of U.S. patent application Ser. No. 16/993,861, filed Aug. 14, 2020, now U.S. Pat. No. 11,185,888, which is a continuation of U.S. patent application Ser. No. 16/551,044, filed Aug. 26, 2019, now U.S. Pat. No. 10,744,533, which is a continuation of U.S. patent application Ser. No. 15/663,060, filed Jul. 28, 3017, now U.S. Pat. No. 10,391,521, which claims the benefit of and priority to U.S. Provisional Application Ser. No. 62/368,495, filed Jul. 29, 2016, the disclosures of which are hereby incorporated by reference in their entireties.

BACKGROUND OF THE DISCLOSURE

Many industries crush rocks to produce material of a preferred or required size for aesthetic, structural, or other purposes. Some applications require the pieces of stone or rock to be not larger than a maximum size. Other applications require the pieces of stone or rock to be within a particular range of acceptable sizes. The original material can begin many orders of magnitude larger than the final size, and the stone can be crushed in a single step or in several steps. After crushing, the stone is sorted based on size of the crushed material and separated into different groups.

In road grading, stone is crushed to produce material with an average size no larger than a predetermined value. The predetermined value is based on the type of material, any additional fill material, such as clay, dirt, sand, or other fill material, and the type of weather to which the road will be exposed. In some regions, the type and size of stone used in the creation of roads may be legislated. To produce stone of the appropriate size, larger stones and other debris are sorted by a padding machine.

The padding machine is driven along a windrow of earthen material (e.g., a mixture of oversized stones, smaller stones, and fine material) laid on the edge of the road under construction. The earthen material of the windrow is picked up by the padding machine and delivered to the side of a trench by the padding machine.

Conventional padding machines use a chain conveyor belt close to the ground to pick up the earthen material from the windrow and convey the earthen material through the padding machine to a sorting or separation table or screen. The separation screen separates the earthen material into relatively acceptable smaller size stones and fine material and oversize stones. The oversize stones are redeposited in a windrow and the remaining earthen material (e.g., smaller size stones and fine material) are directed to a trench or other nearby portion of the construction surface for use in the construction project.

Conventional padding machines and conveyor belts are susceptible to damage from the stone, dirt, and debris during usage. Damage to the conveyor belt may render the entire padding machine inoperable and delay a construction project. Similarly, the delivery of stone to the windrow and removal of stone from the windrow are costly steps of a construction process, both in time and money. Efficient direction of both the smaller stones and fine material and the larger stones after separation may reduce costs and increase construction speed.

SUMMARY

In an embodiment, a device for moving material includes one or more rotors and one or more conveyor belts. The one or more rotors are configured to rotate and move material from the ground or other surface to the one or more conveyor belts. The one or more rotors are positioned such that rotation of the one or more rotors lifts or pushes material onto or toward the one or more conveyor belts to be moved as the one or more conveyor belts move.

In another embodiment, a device for sorting particulate material includes a main conveyor belt, a separation screen, a graded material conveyor, and an oversize material conveyor. The separation screen is configured to receive material from the main conveyor belt and separate the material into a first portion and a second portion. The first portion of the material has a smaller average diameter than the second portion of the material. The graded material conveyor is positioned below the separation screen and configured to receive the first portion of the material. The oversize material conveyor is positioned at the end of the separation screen and configured to receive the second portion of the material.

In yet another embodiment, a device for sorting particulate material includes a main conveyor belt, a rotor, and a separation screen. The rotor is positioned adjacent to an end of the main conveyor belt and configured to rotate relative to the main conveyor belt. The rotor has at least one engagement member connected thereto that rotates with the rotor. The separation screen is configured to receive material from the main conveyor belt and separate the material into a first portion and a second portion.

In a further embodiment, a padding machine includes a main conveyor belt, a first rotor, a separation screen, a graded material conveyor, and an oversize material conveyor. The first rotor is positioned adjacent to an end of the main conveyor belt and configured to rotate relative to the main conveyor belt. The rotor has at least one engagement member connected thereto that rotates with the rotor. The separation screen is configured to receive material from the main conveyor belt and separate the material into a first portion and a second portion. The first portion of the material has a smaller average diameter than the second portion of the material. The graded material conveyor is positioned below the separation screen and configured to receive the first portion of the material. The oversize material conveyor is positioned at the end of the separation screen and configured to receive the second portion of the material.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
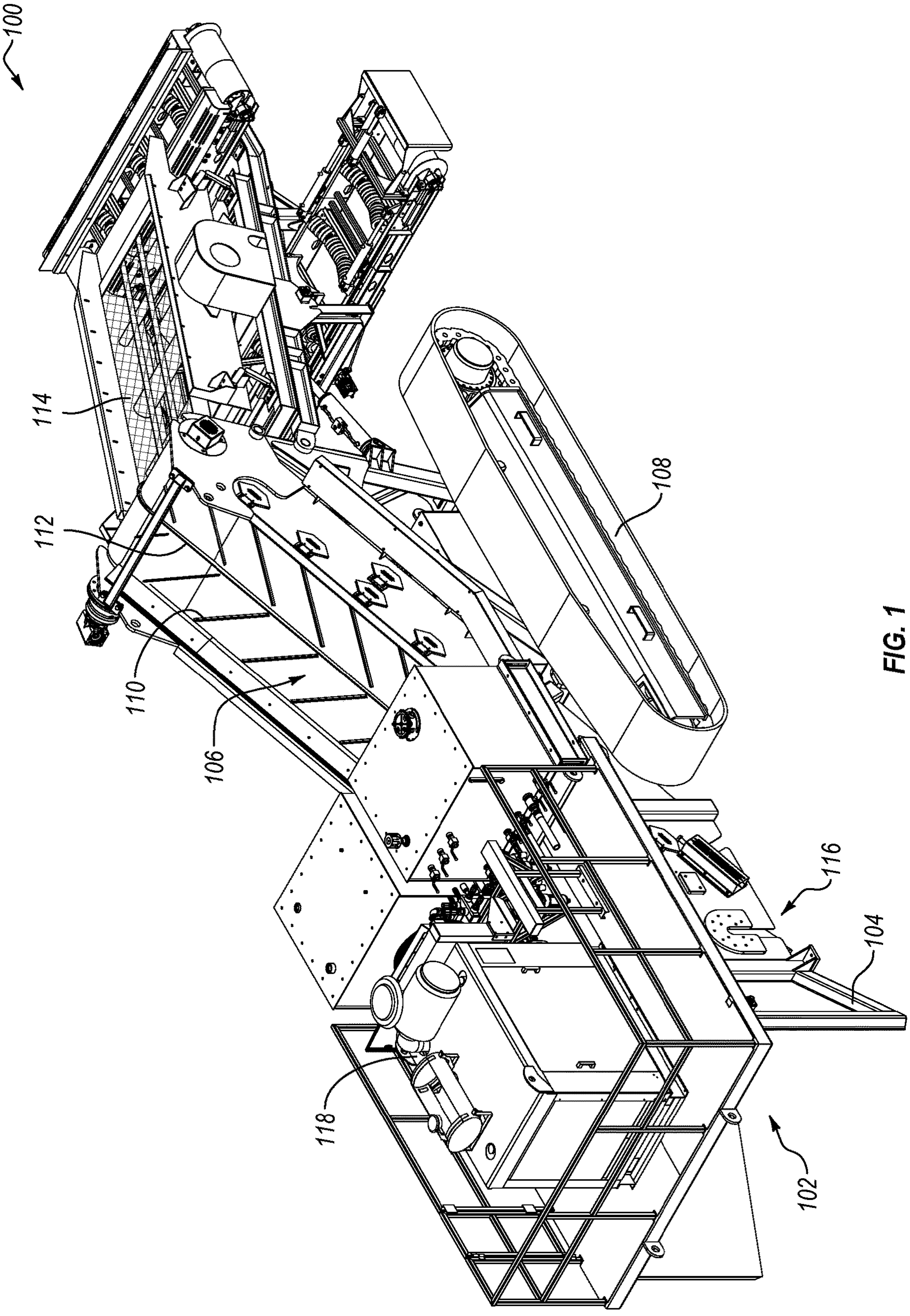
FIG. 1 is a front perspective view of an embodiment of a padding machine, according to the present disclosure.

One or more specific embodiments of the present disclosure will be described below. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

This disclosure generally relates to devices, systems, and methods for conveying and sorting earthen material. More particularly, the present disclosure relates to the collection of particles of earthen material, such as rock, dirt, sand, gravel, and other material used in civil and road engineering projects; separation and/or sorting of the earthen material into different portions based at least partially upon size of the particles; and redeposition of the earthen material after separation and/or sorting.

In accordance with the present disclosure, a padding machine or other heavy machinery is used to collect particles of material (such as earthen material) and move a portion of the material to a trench or other location in an engineering project. The padding machine may include one or more rotors forward of a main conveyor belt to collect the particles of material and deliver the particles to the main conveyor belt. In some embodiments, a rotor may be a rotating body that lifts the particles onto a main conveyor belt. In other embodiments, a rotor may be a rotating or moving body that pushes or sweeps the particles onto a main conveyor belt.

In some embodiments, the main conveyor belt may be a flexible belt. For example, a flexible conveyor belt may include a belt material such as a rubber, polymer, inorganic textile, organic textile, other flexible material, or combinations thereof. A flexible main conveyor belt may move around the one or more rollers and/or gears of a drive system without hinges, links, or other mechanical fasteners into which the particles or other debris may enter. The particles or other debris may wear or damage the hinges, links, or other mechanical fasteners, requiring additional maintenance, repair, or replacement of the main conveyor belt.

The main conveyor belt conveys the particles to a separation screen, which separates the particles into at least a first portion and a second portion, the first portion having an average particle size that is less than the second portion. A graded material conveyor may convey the first portion laterally (e.g., transverse to the main conveyor belt) and redeposit the particles of the first portion to a first lateral side of the padding machine. An oversize material conveyor may convey the second portion laterally and redeposit the particles of the second portion to a second lateral side of the padding machine opposite the first lateral side. In other embodiments, the graded material conveyor and the oversize material conveyor may convey the first portion and second portion of the material, respectively, in any direction or distance in order to separate the first portion and second portion.

FIG. 1 illustrates an embodiment of a padding machine 100 according to the present disclosure. The padding machine 100 has a mouth 102 at or near a front of the padding machine 100 configured to receive the particles of material. For example, the padding machine 100 may move along a windrow or other collection of material and receive the material at the mouth 102. The mouth 102 may have one or more guards 104 that direct the material into the mouth 102. The material is directed through the mouth 102 to a main conveyor belt 106, which may move the material.

The padding machine 100 has a set of tracks 108 or other motive element, such as wheels, skids, legs, feet, or combinations thereof, to move the padding machine 100 relative to the surface upon which the padding machine 100 is used. In other embodiments, the padding machine 100 may be stationary and the material may be moved toward and/or into the mouth 102. In yet other embodiments, the padding machine 100 may be moved by another piece of machinery and/or equipment. For example, the padding machine 100 may be towed by another machine or may be placed on a trailer bed and pulled.

The main conveyor belt 106 may be made of or include a flexible belt material that allows the main conveyor belt 106 to elastically deform. In some embodiments the flexible belt material may be a rubber, a polymer, an inorganic textile, an organic textile, other flexible materials, or combinations thereof. For example, the main conveyor belt 106 may be entirely rubber. In other examples, the main conveyor belt 106 may be a polymer reinforced with a KEVLAR. In yet other examples, the main conveyor belt 106 may be braided metal cables with a rubber coating thereon. In at least one embodiment, the main conveyor belt 106 may be a continuous piece of material without hinges, links, or other breaks in the main conveyor belt 106.

The main conveyor belt 106 may carry material upward using a plurality of retention members 110. The retention members 110 are depicted as a set of angled walls that meet at an angle at or near the longitudinal center 112 of the main conveyor belt 106. The retention members 110 form a V-shaped trough that retains material on the main conveyor belt 106 and limits the movement of the material back down the main conveyor belt 106. In other embodiments, the retention members 110 may meet at a location not along the longitudinal center 112 of the main conveyor belt 106. For example, the retention members 110 may meet at locations on either side of the longitudinal center 112, such that the position of the trough formed by the retention members 110 alternates sides of the longitudinal center 112 as the main conveyor belt 106 moves.

In other embodiments, the retention members 110 may have other shapes and/or sizes. For example, the retention members 110 may be substantially straight across a width of the main conveyor belt 106. In other examples, at least a portion of the retention members 110 may be curved. In yet other examples, the retention members 110 may form a plurality of troughs across a width of the main conveyor belt 106, such as two V-shaped troughs side-by-side across the width of the main conveyor belt 106.

In some embodiments, the retention members 110 may be integrally formed with the main conveyor belt 106. For example, at least one retention member 110 may be made of or include the same belt material as the main conveyor belt 106, such as cast integrally with the rubber, polymer, or other belt material. In another example, at least one retention member 110 may be welded, such as a metal retention member, or melted, such as a meltable polymer or rubber to the main conveyor belt 106. In other embodiments, at least one retention member 110 may be connected to the main conveyor belt 106 by a mechanical interlock, such as a compression fit, friction fit, snap fit, etc.; a mechanical fastener, such as a nut and bolt, threaded rod, screw, nail, staple, clip, clamp, pin, rivet, etc.; an adhesive; or combinations thereof. For example, at least one retention member 110 may be connected to the main conveyor belt 106 by an adhesive and at least one threaded rod.

The main conveyor belt 106 delivers the particles of material to a separation screen 114. The separation screen 114 may have one or more openings therein of a predetermined size. For example, the separation screen 114 may be a mesh or a panel with holes drilled therein. In at least one embodiment, the openings in the separation screen 114 are substantially uniform in size. The openings in the separation screen 114 may allow for particles with at least two dimensions less than the opening size to pass through the separation screen 114. The separation screen 114 may, therefore, exclude particles that are too large to pass through the openings of the separation screen 114.

The separation screen 114 may be actively vibrated to move material through and/or along the separation screen 114. For example, the separation screen 114 may be connected to and/or mounted on one or more vibration sources to vibrate the separation screen 114 in one or more axes to move and rotate the particles of material thereon for more efficient separation. In other embodiments, the separation screen 114 may be passively vibrated, such as receiving the vibrations of one or more engines and/or motors connected to and/or mounted on the padding machine 100. In such embodiments, an additional or dedicated vibration mechanism may be redundant.

In some embodiments, the padding machine 100 may include one or more rotors 116 in the mouth 102 that may assist in moving particles of material from the ground to the main conveyor belt 106. For example, the retention members 110 may assist in urging material up the main conveyor belt 106 once on the main conveyor belt 106, while the rotor(s) or other device may increase the efficiency of transporting material to the main conveyor belt 106 from the ground. Various embodiments of the rotor(s) 116 will be described in greater detail in relation to FIG. 6 through FIG. 11.

The padding machine 100 includes a power supply 118, such as an internal combustion engine, a generator, a battery, other electrical energy storage devices, or combinations thereof to provide energy to move the main conveyor belt 106, the tracks 108, the separation screen 114, the rotor(s) 116, or other components of the padding machine 100.

Figure 2:
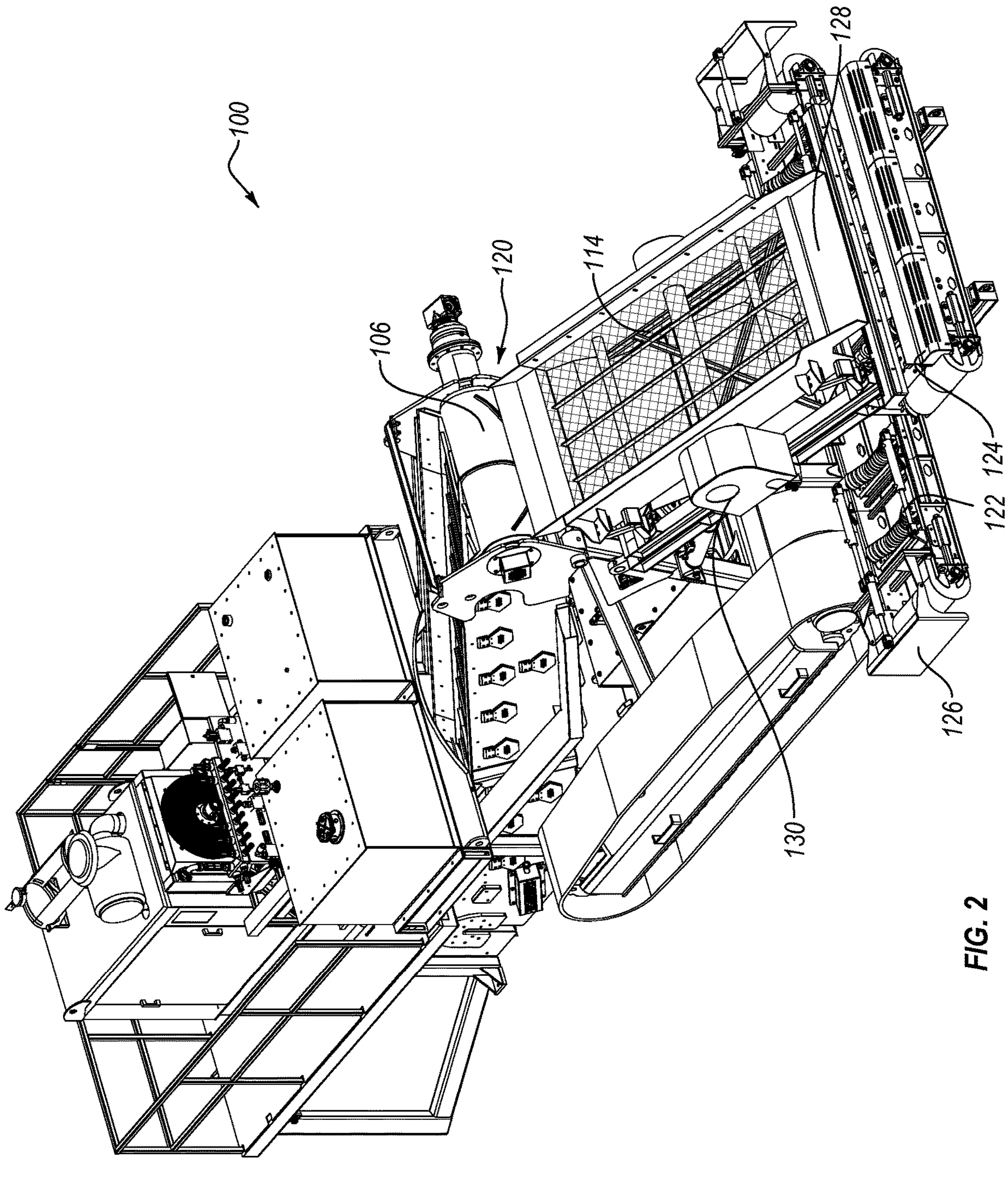
FIG. 2 is a rear perspective view of the embodiment of a padding machine of FIG. 1, according to the present disclosure.

FIG. 2 illustrates the rear portion of the padding machine 100 including the separation screen 114 and a graded material conveyor 122 and an oversize material conveyor 124. The separation screen 114 includes an upper edge 120 that receives material from the main conveyor belt 106 and a bottom edge 128 that delivers at least part of the material to the oversize material conveyor 124. The graded material conveyor 122 is positioned below the separation screen 114 to receive a first portion of the material that passes through the separation screen 114 and falls downward to the graded material conveyor 122.

The upper edge 120 may contact the main conveyor belt 106 to mechanically remove (e.g., scrape or agitate) material from the main conveyor belt 106 as the main conveyor belt 106 moves. In other embodiments, the upper edge 120 may be spaced apart from, such as below, the main conveyor belt 106 to allow material to fall from the main conveyor belt 106 onto the upper edge 120 and/or separation screen 114.

The oversize material conveyor 124 is positioned below the bottom edge 128 of the separation screen 114 to receive a second portion of the material that is too large to fall through the openings in the separation screen 114 or otherwise does not pass through the separation screen 114.

The graded material conveyor 122 and the oversize material conveyor 124 may be configured to convey material in either lateral direction. For example, the graded material conveyor 122 and the oversize material conveyor 124 may be configured to selectively move a conveyor belt to the left or to the right relative to the separation screen 114.

In some embodiments, the graded material conveyor 122 and the oversize material conveyor 124 may be configured to convey material in the same lateral direction. For example, the graded material conveyor 122 may convey the first portion of the material (i.e., the smaller diameter particles) in a first lateral direction and the oversize material conveyor 124 may convey the second portion of the material (i.e., the larger diameter particles) in the first lateral direction also such that the first portion of the material and the second portion of the material are deposited in adjacent piles on a single side of the padding machine 100. Such adjacent piles may be useful in building a bank with a gradient in particle size for drainage purposes.

In other embodiments, the graded material conveyor 122 and the oversize material conveyor 124 may be configured to convey material in opposite lateral directions. For example, the graded material conveyor 122 may convey the first portion of the material (i.e., the smaller diameter particles) in a first lateral direction and the oversize material conveyor 124 may convey the second portion of the material (i.e., the larger diameter particles) in an opposite second lateral direction such that the first portion of the material and the second portion of the material are deposited in parallel piles on opposing sides of the padding machine 100. Such parallel piles may be separated by at least the width of the padding machine 100, allowing one or both of the piles to be moved and/or manipulated by other machinery or workers without interfering with the other pile. For example, the second portion of the material (i.e., the larger diameter particles) may be removed from a road surface while the smaller diameter particles may be used for construction of the road surface.

In some embodiments, the conveyance speed (e.g., rotational speed) of the graded material conveyor 122 and/or oversize material conveyor 124 may be fixed. In other embodiments, the conveyance speed (e.g., rotational speed) of the graded material conveyor 122 and/or oversize material conveyor 124 may be variable and/or user selectable. For example, the conveyance speed of the graded material conveyor 122 may be greater than the conveyance speed of the oversize material conveyor 124. In other examples, the conveyance speed of the graded material conveyor 122 may be less than the conveyance speed of the oversize material conveyor 124. In yet other examples, the conveyance speed of the graded material conveyor 122 and/or oversize material conveyor 124 may be within a range of 0.25 feet per second to 10 feet per second. The conveyance speed of the graded material conveyor 122 and/or oversize material conveyor 124 may at least partially control the location of the material deposited by the graded material conveyor 122 and/or oversize material conveyor 124.

To further aid in controlling the deposition of the material from the graded material conveyor 122 and/or oversize material conveyor 124, a padding machine 100 may include a control plate 126 to control the angle and distance at which the first portion of the material is deposited. For example, FIG. 2 illustrates a control plate 126 attached to either end of the graded material conveyor 122. In some embodiments, the position of the control plate 126 may be adjustable relative to the graded material conveyor 122 to adjust the angle of the control plate 126. By way of example, the control plate 126 may be a hydraulic feed control plate that is adjustable by way of hydraulics. For instance, at least a portion of the control plate 126 may be raised (e.g., moved farther from the graded material conveyor 122 and/or oriented closer to horizontal) to allow material from the graded material conveyor 122 to be deposited farther from the padding machine 100. The control plate 126 may be lowered (e.g., brought closer to the graded material conveyor 122 and/or oriented closer to vertical) to limit the distance to which the material may be thrown from the graded material conveyor 122.

In some embodiments, a static position of the control plate 126 may be selected by an operator to direct the material at a particular target, such as into a trench. In other embodiments, the position of the control plate 126 may be varied to distribute the material evenly over a wider area than a static control plate 126 position.

In some embodiments, a relative vertical angle of the graded material conveyor 122 and oversize material conveyor 124 may be adjustable. For example, FIG. 2 illustrates the graded material conveyor 122 and oversize material conveyor 124 parallel to one another. In other examples, the graded material conveyor 122 and oversize material conveyor 124 may be tiltable in the lateral direction such that a vertical angle between the graded material conveyor 122 and oversize material conveyor 124 may be in a range having an upper value, a lower value, or upper and lower values including any of 1°, 2°, 4°, 6°, 8°, 10°, 15°, 20°, 25°, 30°, or any angles therebetween. For example, a vertical angle between the graded material conveyor 122 and oversize material conveyor 124 may be greater than 1°. In other examples, the vertical angle between the graded material conveyor 122 and oversize material conveyor 124 may be greater than 5°. In other examples, the vertical angle between the graded material conveyor 122 and oversize material conveyor 124 may be adjustable up to 30°.

In some embodiments, such as shown in FIG. 2, a padding machine 100 may include one or more vibration sources 130. For example, the vibration source 130 may be connected to the separation screen 114 and configured to transmit vibration from the vibration source 130 to the separation screen 114. In other examples, the vibration source 130 may at least partially support the separation screen 114 such that when a portion of the vibration source 130 moves, the separation screen 114 moves.

In some embodiments, the vibration source 130 may be a motor that provides at least one direction of movement to the separation screen 114. For example, the vibration source 130 may move the separation screen 114 in an oscillatory fashion in a single direction, such as normal to a surface of the separation screen 114, in plane with the separation screen 114, or combinations thereof. In other examples, the vibration source 130 may move the separation screen 114 in more than one direction, such as in an orbital fashion in two dimensions or in three dimensions. The movement of the separation screen 114 by the vibration source 130 may assist in moving material down the separation screen 114 toward the bottom edge 128 and to mobilize the material to allow smaller diameter particles to sift downward and separate from the larger diameter particles of material.

Figure 3A:
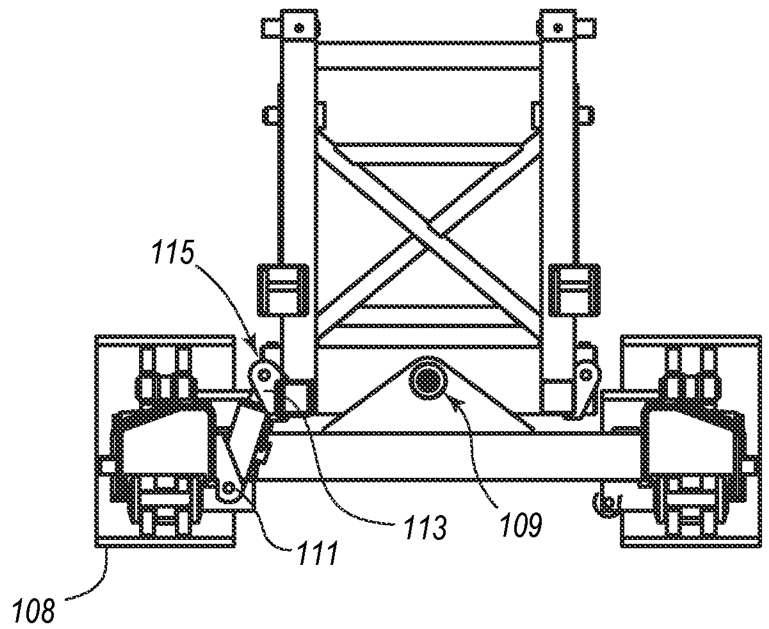
FIG. 3A is a front partial cross-section of a padding machine frame and tracks of FIG. 1, according to the present disclosure.
Figure 3B:
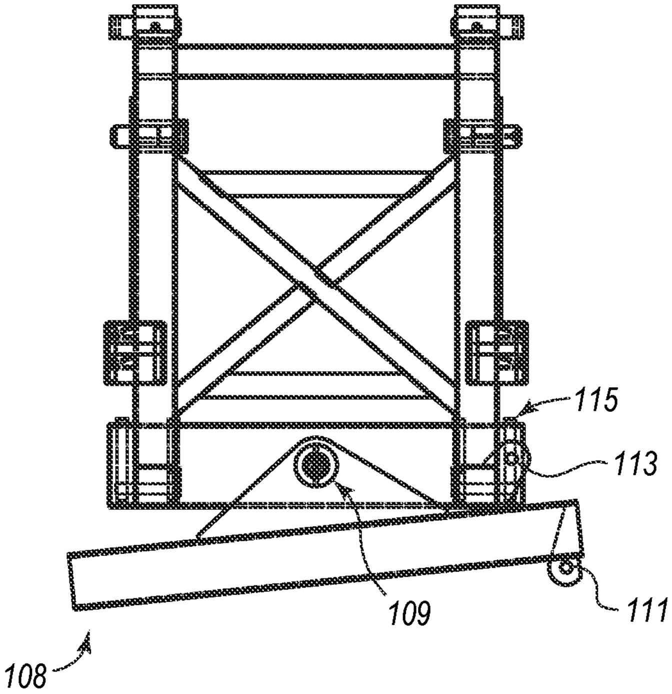
FIG. 3B is a side partial cross section of a padding machine frame and tracks of FIG. 3A with the track being rotated, according to the present disclosure.
Figure 3C:
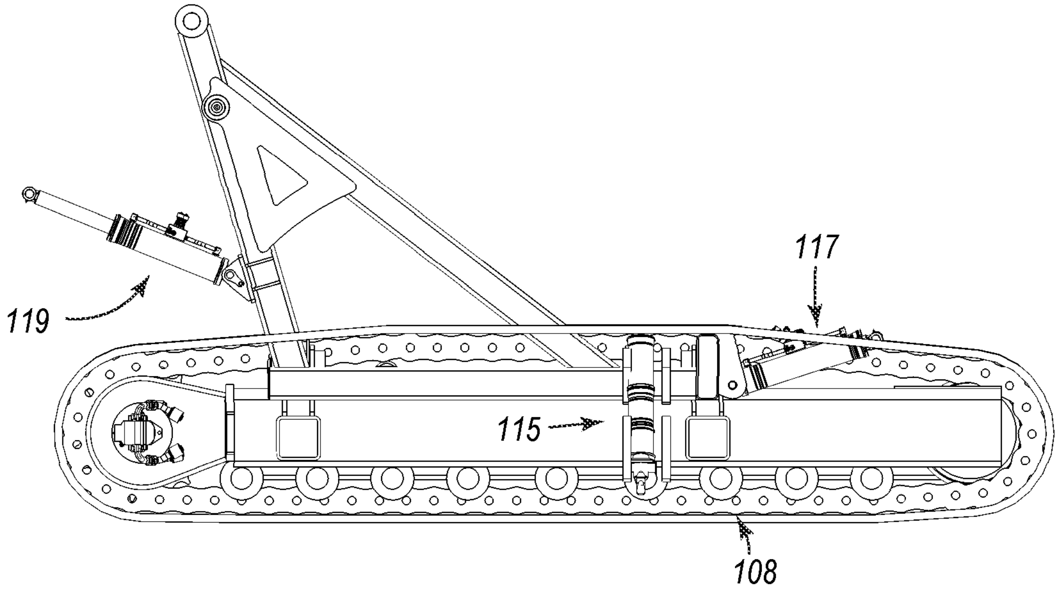
FIG. 3C is a side partial cross section of a padding machine frame and tracks of FIG. 3A, according to the present disclosure.

As shown in FIGS. 3A-3C, in some embodiments, the padding machine 100 can include one or more leveling devices for adjusting the leveling/positioning of one or more components of the padding machine 100. For example, as illustrated in FIG. 3A, a padding machine can include tracks 108 and a padding machine frame 113. The tracks 108 and frame 113 can be pivotally connected to one another at a pivot joint 109 to enable the tracks 108 and/or frame 113 to pivot relative to the other. This can be useful in the event that the padding machine is traversing unlevel ground. For instance, if the padding machine is traversing across a hill (e.g., so that one of the tracks 108 is vertically higher or lower than the other track 108), the frame 113 can be pivoted side-to-side relative to the tracks so as that the components mounted thereon (e.g., conveyors, screens, etc.) can be levelled.

As shown in FIG. 3A, a leveling ram 115 (e.g., a hydraulic leveling ram, worm drive, piston, etc.) can be associated with a track member 111 and the padding machine frame 113 such that movement of the leveling ram is translated to the connected members, thereby causing movement of the padding machine frame relative to the track. For example, constriction of the leveling ram (e.g., a reduction in length of the leveling ram) causes the frame 113 to pitch towards one of the tracks 108, as shown in FIG. 3B. It should be appreciated that although not depicted in FIG. 3B, the leveling ram can also extend to cause the frame 113 to pitch away from one of the tracks 108 and toward the other track 108. In doing so, the leveling ram can affect the side-to-side leveling of the frame 113 and associated components with respect to the tracks 108.

Additionally, or alternatively, in some embodiments, the graded material conveyor 122 and oversize material conveyor 124 may be adjusted fore and aft to a level position in the event that the padding machine 100 is operating on an incline (e.g., going up or down a hill). For example, FIG. 3C illustrates additional leveling devices—depicted as leveling rams 117, 119—that can act to affect one or more of a horizontal, vertical, and/or lateral pitch of one or more components of the padding machine 100. As an exemplary illustration of the foregoing, the separation screen 114 may be leveled (e.g., directly by leveling ram 119 or indirectly by any of leveling ram 115, 117, and/or 119) such that the separable material is evenly conveyed down and/or through the separation screen 114 to appropriate conveyors (e.g., conveyors 122, 124), regardless of the contour of the terrain. As an additional example, the main conveyor belt 106, rotor(s) 116, and/or mouth 102 can also be selectively leveled.

In any of the foregoing embodiments—where one or more components of the padding machine 100 can be leveled—the components can be individually and/or collectively leveled. In some embodiments, a user can manually engage one or more components (or electronically configure such components) to selectively level each component as desired, or in some embodiments, the user can collectively level the padding machine with respect to the surface (e.g., by leveling the mouth 102, tracks 108, rotor(s) 116, main conveyor belt 106, separation screen 114, graded material conveyor 122, and oversize material conveyor 124 at the same or substantially the same time). In some embodiments, one or more components are automatically leveled with respect to the surface. For example, the padding machine 100 can include a leveling device that determines the grade or level of the padding machine 100 (e.g., by detecting a relative difference in pressure between the tracks 108, by an onboard accelerometer, gyroscope, automatic leveling system, or similar), and based on the determined grade, the padding machine 100 or portions thereof can be automatically leveled (e.g., to a position perpendicular to the force of gravity).

In some embodiments, leveling the padding machine 100—whether automatically or manually—can provide additional benefits. For example, a padding machine 100 that is level can convey and sort material more efficiently and more accurately. As an additional example, by adjusting the mouth 102 of the padding machine 100 to be parallel to the grade of the surface, while concurrently maintaining level conveyance and sorting components, the padding machine 100 may be able to conform to the surface and collect and sort material more efficiently.

Figure 4:
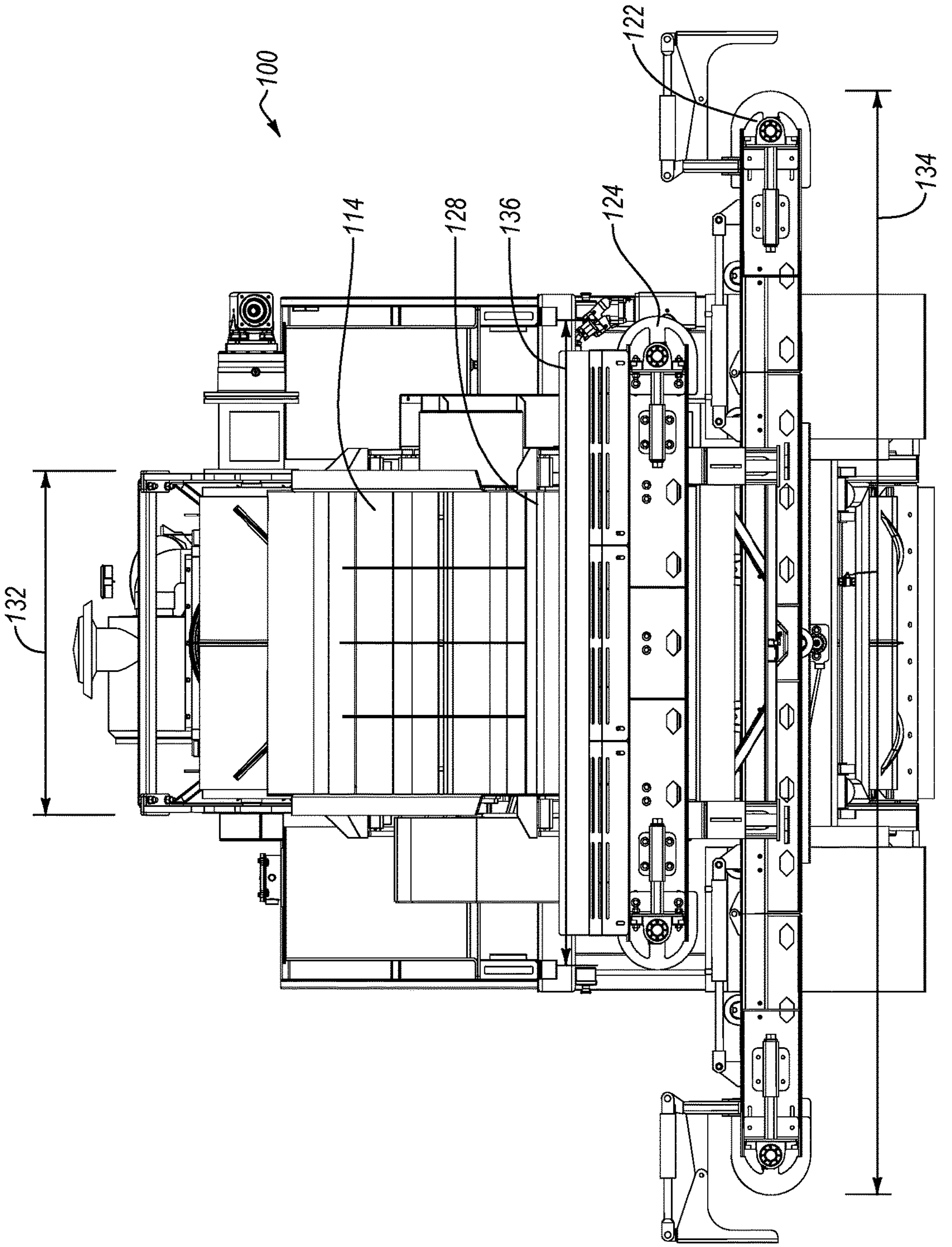
FIG. 4 is a rear view of the embodiment of a padding machine of FIG. 1, according to the present disclosure.

FIG. 4 illustrates a rear view of the padding machine 100. In some embodiments, the graded material conveyor 122 may be positioned lower than the oversize material conveyor 124. In other embodiments, the graded material conveyor 122 may be positioned higher than the oversize material conveyor 124. In yet other embodiments, the graded material conveyor 122 and oversize material conveyor 124 may be positioned at substantially equivalent heights above the ground and/or relative to the padding machine 100.

In some embodiments, the graded material conveyor 122 and/or oversize material conveyor 124 may be moveable in a lateral direction to vary the distance at which material is deposited from the graded material conveyor 122 and/or oversize material conveyor 124. For example, the graded material conveyor 122 may be movable relative to the separation screen 114 by at least 10% of a graded material conveyor width 134. In other examples, the graded material conveyor 122 may be movable relative to the separation screen 114 by at least 20% of the graded material conveyor width 134. In yet other examples, the graded material conveyor 122 may be movable relative to the separation screen 114 by at least 30% of the graded material conveyor width 134.

In some embodiments, the oversize material conveyor 124 may be movable relative to the separation screen 114 by at least 10% of an oversize material conveyor width 136. In other examples, the oversize material conveyor 124 may be movable relative to the separation screen 114 by at least 20% of the oversize material conveyor width 136. In yet other examples, the oversize material conveyor 124 may be movable relative to the separation screen 114 by at least 30% of the oversize material conveyor width 136.

FIG. 4 also illustrates the relative size of the graded material conveyor 122 and oversize material conveyor 124 relative to the separation screen 114. The separation screen 114 may have a separation screen width 132. The graded material conveyor 122 may have a graded material conveyor width 134 and the oversize material conveyor 124 may have an oversize material conveyor width 136 that are each at least partially related to the separation screen width 132, respectively.

In some embodiments, the graded material conveyor width 134 may be a percentage of the separation screen width 132 in a range having an upper value, a lower value, or an upper and lower value including any of 100%, 125%, 150%, 175%, 200%, 225%, 250%, 275%, 300%, or any values therebetween. For example, the graded material conveyor width 134 may be greater than 100% of the separation screen width 132. In other examples, the graded material conveyor width 134 may be less than 300% of the separation screen width 132. In yet other examples, the graded material conveyor width 134 may be in a range of 100% to 300% of the separation screen width 132. In further examples, the graded material conveyor width 134 may be in a range of 150% to 250% of the separation screen width 132.

In some embodiments, the oversize material conveyor width 136 may be a percentage of the separation screen width 132 in a range having an upper value, a lower value, or an upper and lower value including any of 100%, 125%, 150%, 175%, 200%, 225%, 250%, 275%, 300%, or any values therebetween. For example, the oversize material conveyor width 136 may be greater than 100% of the separation screen width 132. In other examples, the oversize material conveyor width 136 may be less than 300% of the separation screen width 132. In yet other examples, the oversize material conveyor width 136 may be in a range of 100% to 300% of the separation screen width 132. In further examples, the oversize material conveyor width 136 may be in a range of 150% to 250% of the separation screen width 132.

In some embodiments, the oversize material conveyor width 136 may be a percentage of the graded material conveyor width 134 in a range having an upper value, a lower value, or an upper and lower value including any of 25%, 50%, 75%, 100%, 125%, 150%, 175%, 200%, or any values therebetween. For example, the oversize material conveyor width 136 may be greater than 25% of the graded material conveyor width 134. In other examples, the oversize material conveyor width 136 may be less than 200% of the graded material conveyor width 134. In yet other examples, the oversize material conveyor width 136 may be in a range of 25% to 200% of the graded material conveyor width 134. In further examples, the oversize material conveyor width 136 may be in a range of 50% to 100% of the graded material conveyor width 134. In at least one embodiment, the oversize material conveyor width 136 may be about 66% of the graded material conveyor width 134.

Figure 5:
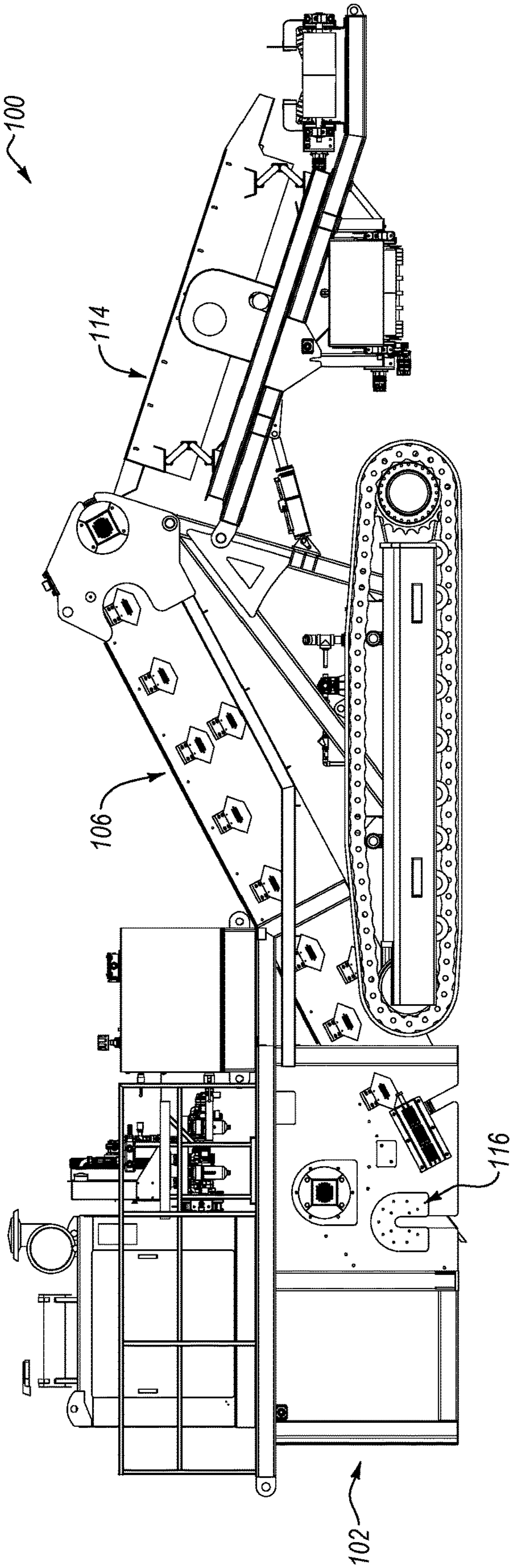
FIG. 5 is a side view of the embodiment of a padding machine of FIG. 1, according to the present disclosure.

FIG. 5 is a side view of the embodiment of a padding machine 100. The padding machine 100 may receive debris or other material at the mouth 102 of the padding machine 100 and may guide the material onto the main conveyor belt 106. The main conveyor belt 106 may carry the material to the separation screen 114, as described herein. The material is moved from the ground on which the padding machine 100 is located to the main conveyor belt 106 by one or more rotors 116.

Figure 6:
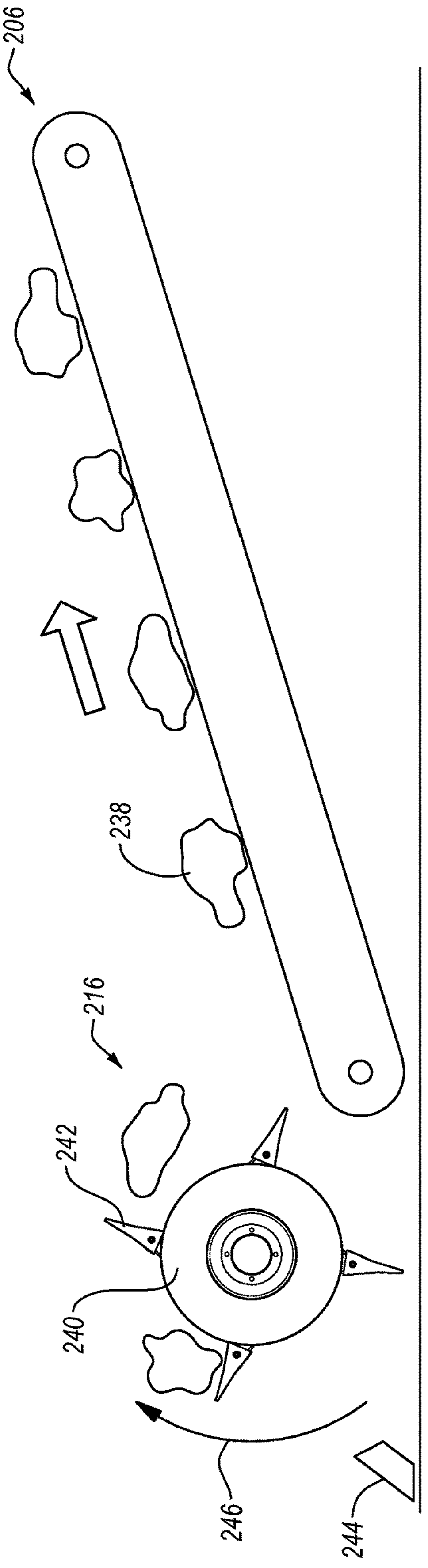
FIG. 6 is a schematic representation of an embodiment of a rotor and conveyor belt, according to the present disclosure.

FIG. 6 illustrates a schematic representation of an embodiment of a rotor 216 and main conveyor belt 206 to move material from the ground or other surface onto the main conveyor belt 206 and then along main conveyor belt 206. The rotor 216 may rotate and move material 238 onto the main conveyor belt 206, which may then move the material up toward a separation screen. In some embodiments, the rotor 216 may be positioned to contact and move material at/or near the ground. In other embodiments, the rotor 216 may be positioned to receive material 238 from a ramp 244 or other guidance mechanism positioned in front of the rotor 216 that guides the material 238 to the rotor 216. For example, at least part of the rotor 216 may be positioned between the ramp 244 and the main conveyor belt 206.

In some embodiments, the rotor 216 may have a body 240 and one or more engagement members 242 to engage with the material and move the material on to the main conveyor belt 206. For example, the engagement members 242 may be paddles, duck bills, prongs, bars, or other grasping shapes to lift or otherwise push the material 238 onto the main conveyor belt 206. In some embodiments, a forward side of the rotor 216 may rotate in an upward direction 246, as viewed from the front of the padding machine, and lift material 238 upward and over the rotor 216 before depositing the material 238 onto the main conveyor belt 206.

Figure 7:
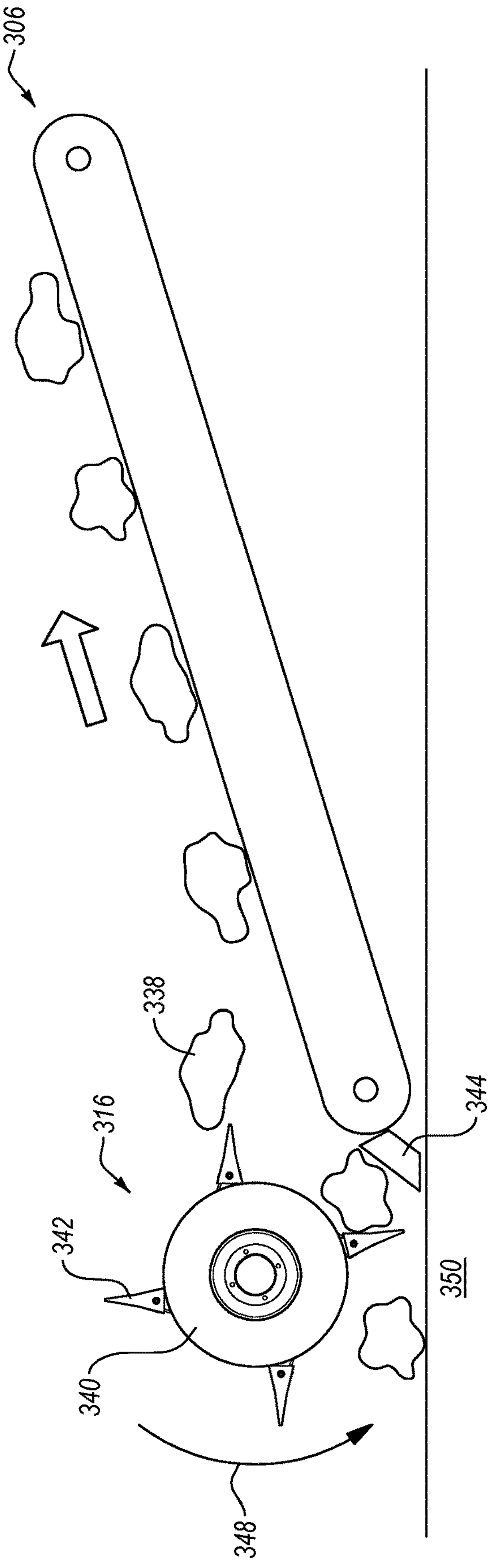
FIG. 7 is another schematic representation of an embodiment of a rotor and conveyor belt, according to the present disclosure.

In other embodiments, such as shown in FIG. 7, a rotor 316 may be configured to rotate in a downward direction 348, as viewed from the front of the padding machine. The rotation of a forward side of the rotor 316 in the downward direction 348 may press material 338 against the ground 350 and urge the material 338 up a ramp 344 or other guidance mechanism located behind the rotor 316 to move the material 338 onto the main conveyor belt 306. In at least one embodiment, the material 338 may be in contact with both the main conveyor belt 306 and the rotor 316 at the same time. For example, the material 338 may be lifted to the main conveyor belt 306 by the engagement members 342 and may be in contact with the engagement members 342 and/or the body 340 of the rotor 316 at the same time as being in contact with the main conveyor belt 306.

In some embodiments, the rotor 316 may rotate (in the downward direction 348 or the upward direction 246 shown in FIG. 6) at a fixed rotational speed. In other embodiments, the rotor 316 may rotate (in the downward direction 348 or the upward direction 246 shown in FIG. 6) at a variable rotational speed. For example, the rotor 316 may rotate at a user selectable rotational speed. In other examples, the rotor 316 may vary in speed during operation to move material 338 of varying size and/or mass onto the main conveyor belt 306.

In some embodiments, a rotor may rotate at a rotational speed in a range having an upper value, a lower value, or upper and lower values including any of 15 RPM revolutions per minute (RPM), 30 RPM, 45 RPM, 60 RPM, 90 RPM, 120 RPM, 150 RPM, 180 RPM, 240 RPM, greater than 240 RPM, or any value therebetween. For example, a rotor may rotate at greater than 15 RPM. In other examples, the rotor may rotate at less than 240 RPM. In yet other examples, the rotor may rotate at a rotational speed in a range of 15 RPM to 240 RPM. In further examples, the rotor may rotate at a rotational speed in a range of 30 RPM to 120 RPM.

Figure 8:
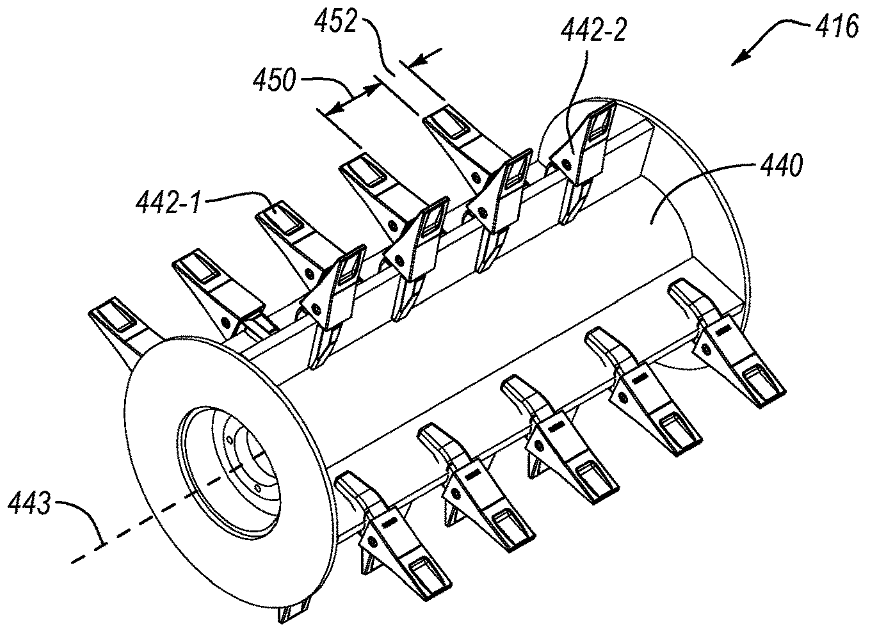
FIG. 8 is a perspective view of an embodiment of a rotor, according to the present disclosure.

FIG. 8 illustrates an embodiment of a rotor 416 having a body 440 and a plurality of engagement members 442-1, 442-2 extending radially outward from the body 440. The rotor 416 is configured to rotate about a rotational axis 443 that extends through the rotor 416 in a direction transverse to movement of the padding machine on the tracks 108 described in relation to FIG. 1. In other embodiments, the rotational axis 443 of the rotor 416 may be oriented at an angle to the movement of the padding machine on the tracks 108 described in relation to FIG. 1.

Referring again to FIG. 8, the rotor 416 may have a plurality of rows of engagement members 442-1, 442-2. In some embodiments, each successive row of engagement members 442-1, 442-2 may be identical as the rotor 416 rotates. In other embodiments, at least one successive row of engagement members 442-1, 442-2 may be different from the rotor 416. For example, the engagement members 442-1, 442-2 may be sized and arranged such that the engagement members 442-1, 442-2 of each successive row are staggered (e.g., positioned not aligned with the successive row) as the rotor 416 rotates. In some embodiments, the positioning of the engagement members 442-1, 442-2 may result in at least a portion of a first engagement member 442-1 of a first row overlapping in position with a second engagement member 442-2 of a second row. In other embodiments, the first engagement member 442-1 of a first row may be positioned between two second engagement members 442-2 of a second row and vice versa.

In some embodiments, the engagement members 442-1 within a row may be spaced apart with a spacing 450 that is at least partially related to an engagement member width 452. For example, the spacing 450 between the engagement members 442-1 may be a percentage of the engagement member width 452. In some embodiments, the spacing 450 may be a percentage of the engagement member width 452 in a range having an upper value, a lower value, or upper and lower values including any of 25%, 50%, 75%, 100%, 125%, 150%, 175%, 200%, greater than 200%, or any values therebetween. For example, the spacing 450 may be greater than 25% of the engagement member width 452. In other examples, the spacing 450 may be less than 250% of the engagement member width 452. In yet other examples, the spacing 450 may be a percentage of the engagement member width 452 in a range of 25% to 250%. In further examples, the spacing 450 may be a percentage of the engagement member width 452 in a range of 50% to 200%. In yet further examples, the spacing 450 may be a percentage of the engagement member width 452 in a range of 75% to 150%. In at least one example, the spacing 450 may be about equal to the engagement member width 452. In at least one embodiment, the engagement member width may be between 3 and 4 inches.

Figure 9A:
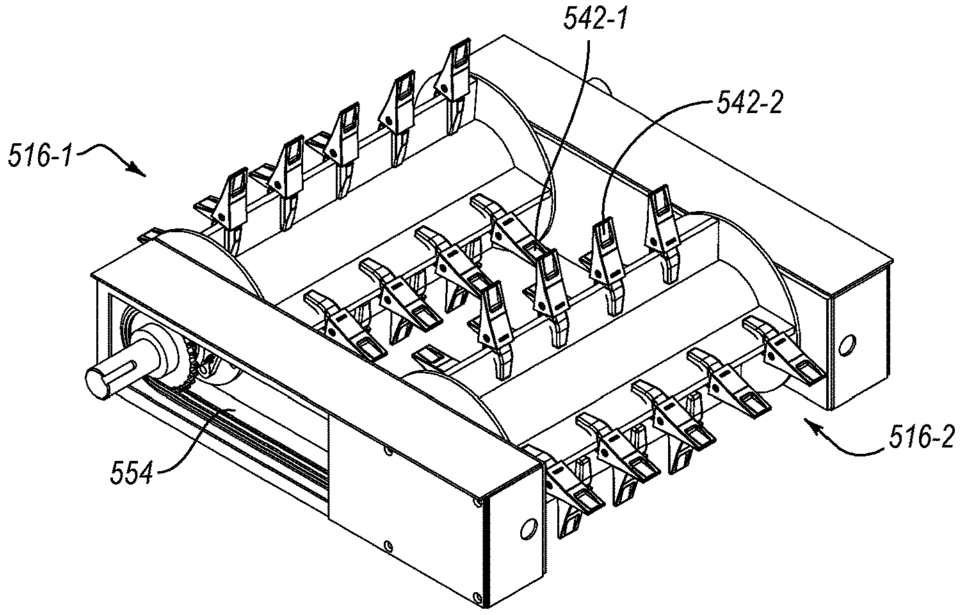
FIG. 9A is a perspective view of another embodiment of a rotor, according to the present disclosure.
Figure 9B:
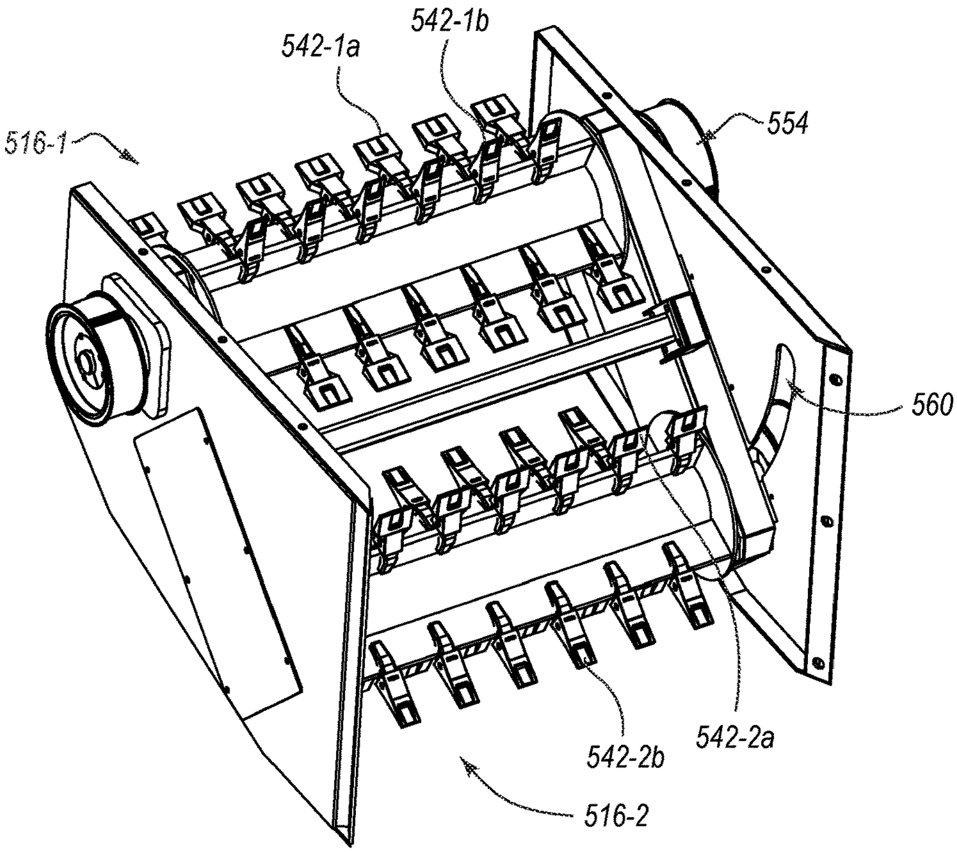
FIG. 9B is a perspective view of still another embodiment of a rotor, according to the present disclosure.
Figure 9C:
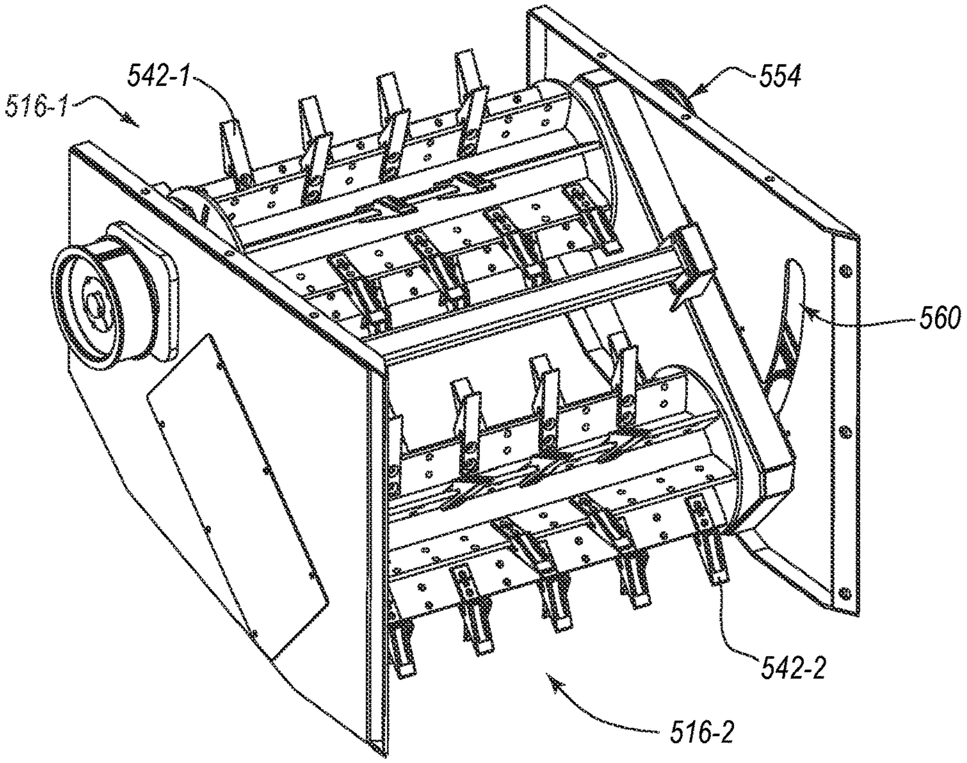
FIG. 9C is a perspective view of yet another embodiment of a rotor, according to the present disclosure.

As shown in FIGS. 9A-9C, in some embodiments, a padding machine may include a plurality of rotors 516-1, 516-2 to move material onto a main conveyor belt. For example, a first rotor 516-1 may lift and move material rearward toward the second rotor 516-2. In some embodiments, the first rotor 516-1 may throw the material over the second rotor 516-2 toward a main conveyor belt. In other embodiments, the first rotor 516-1 may move the material rearward toward the second rotor 516-1 and the second rotor 516-2 may also move the material rearward. In yet other embodiments, the second rotor 516-2 may also lift and move material onto the main conveyor belt. In further embodiments, a padding machine may include more than two rotors, such as three rotors, four rotors, five rotors, six rotors, or more rotors to lift and/or move material to the main conveyor belt.

The first rotor 516-1 and second rotor 516-2 of FIGS. 9A-9C may be joined by a linkage 554. The linkage 554 may link the rotational speed of the first rotor 516-1 and the second rotor 516-2. In some embodiments, the first rotor 516-1 and second rotor 516-2 may rotate at substantially equal speeds. In other embodiments, the first rotor 516-1 and second rotor 516-2 may rotate at different speeds. For example, the first rotor 516-1 may rotate faster than the second rotor 516-2. In other examples, the first rotor 516-1 may rotate slower than the second rotor 516-2. Additionally, or alternatively, the first rotor 516-1 can rotate in a first direction and the second rotor 516-2 can rotate in a second direction. In some embodiments, the first and second direction are the same rotational direction. In some embodiments, the first and second direction are opposite rotational directions. That is, in some embodiments, the first and second rotors 516-1, 516-2 are joined by a linkage 554 yet rotate in opposite directions. Such a feat can be enabled by any means known in the art, including, for example, by the addition of an intervening gear associated with the second rotor 516-2 that operably changes the rotational direction thereof.

It should be appreciated that although the drive mechanism associated with linkage 554 is illustrated in FIG. 9A as being positioned on an interior sidewall, the drive mechanism and linkage 554 can, alternatively, be positioned on an exterior sidewall thereof as shown in FIGS. 9B and 9C. Positioning the drive mechanism on an exterior sidewall can provide certain advantages in some implementations. For example, relocating the drive mechanism to an exterior side can increase the amount of space available for positioning engagement members along rotors. It can additionally, or alternatively, reduce exposure of the drive mechanism to the dirt, rocks, or other material processed by the padding machine and/or increase accessibility for maintenance purposes. It should also be appreciated that the linkage 554 can include, for example, a poly chain, a drive chain, a roller chain, etc.

In some embodiments, and as depicted in FIG. 9A, the first rotor 516-1 may have a first engagement member 542-1, and the second rotor 516-2 may have a second engagement member 542-2. In some embodiments, the first engagement member 542-1 and second engagement member 542-2 may be substantially aligned. In other embodiments, the first engagement member 542-1 and second engagement member 542-2 may at least partially overlap. In yet other embodiments, the first engagement member 542-1 and second engagement member 542-2 may be positioned such that there is no overlap between the first engagement member 542-1 and second engagement member 542-2. In at least one example, the first engagement member 542-1 and second engagement member 542-2 may be positioned such that the first engagement member 542-1 is positioned between a pair of second engagement members 542-2 without overlapping either of the second engagement members 542-2. The first rotor 516-1 and second rotor 516-2 may, thereby, provide substantially equal coverage across the width of the rotors 516-1, 516-2 to pick up and/or move material.

In some embodiments, and as depicted in FIG. 9B, the first rotor 516-1 may have a first engagement member 542-1*a* and a second engagement member 542-1*b*, and the second rotor 516-2 may have a first engagement member 542-2*a* and a second engagement member 542-2*b*. As illustrated, the first engagement members 542-1*a*, 542-2*a* can be positioned on a first segment of the rotor 516-1, 516-2, respectively, and the second engagement members 542-1*b*, 542-2*b* can be positioned on at least a second segment of the rotor 516-1, 516-2, respectively. The rotors 516-1, 516-2 can have a plurality of segments that alternate between first engagement members 542-1*a*, 542-2*a* and second engagement members 542-1*b*, 542-2*b* and may additionally be positioned between corresponding engagement members on the opposite rotor (e.g., first engagement members 542-1*a* of rotor 516-1 are positioned to move between second engagement members 542-2*b* of rotor 516-2, and first engagement members 542-2*a* of rotor 516-2 are positioned to move between second engagement members 542-2*b* of rotor 516-2.

In some embodiments, the first engagement members 542-1*a*, 542-2*a* are different than second engagement members 542-1*b*, 542-2*b*. For example, and as depicted in FIG. 9B, the first engagement members 542-1*a*, 542-2*a* are duck bills, and the second engagement members 542-2*a*, 542-2*b* are paddles positioned so as to pass between adjacent duck bills disposed on an opposite rotor.

In some embodiments, each rotor 516-1, 516-2 can include a plurality of engagement members that are distributed and positioned on different rows of the rotor 516-1, 516-2. In some embodiments, each row of engagement members includes the same number of engagement members. In other embodiments, the number of engagement members positioned on each row of a rotor can be different. For example, as illustrated in FIG. 9A, the engagement members 542-1, 542-2 of each rotor 516-1, 516-2 alternate between five engagement members 542-1, 542-2 on a first row and four engagement members 542-1, 542-2 on an adjacent row. Additionally, or alternatively, the number of engagement members positioned on a row can sequentially increase, include a different pattern of engagement members between a plurality of rows, or include any number of engagement members on a row, which may or may not be the same.

For example, as illustrated in FIG. 9C, a first rotor 516-1 can include two engagement members 542-1 on a first row, three engagement members 542-1 on an adjacent second row, four engagement members 542-1 on a third row adjacent to the second row, five engagement members 542-1 on the fourth row adjacent to the third row, increasing sequentially with each additional row. In one embodiment, the number of engagement members positioned on rows is cyclic (e.g., a rotor having five rows of engagement members can include two engagement members on a first row, three engagement members on a second row, four engagement members on a third row, and three engagement members on a fifth row, returning cyclically to the first row having two engagement members). It should be appreciated that the number or type of engagement members can alternate between rows (as shown in FIG. 5B) or can be interdispersed within a row at any number or proportion. Additionally, or alternatively, the engagement members can also be offset or aligned with respect to an adjacent row of engagement members on the same rotor or with respect to an opposing set of engagement members on an adjacent rotor.

Figure 10:
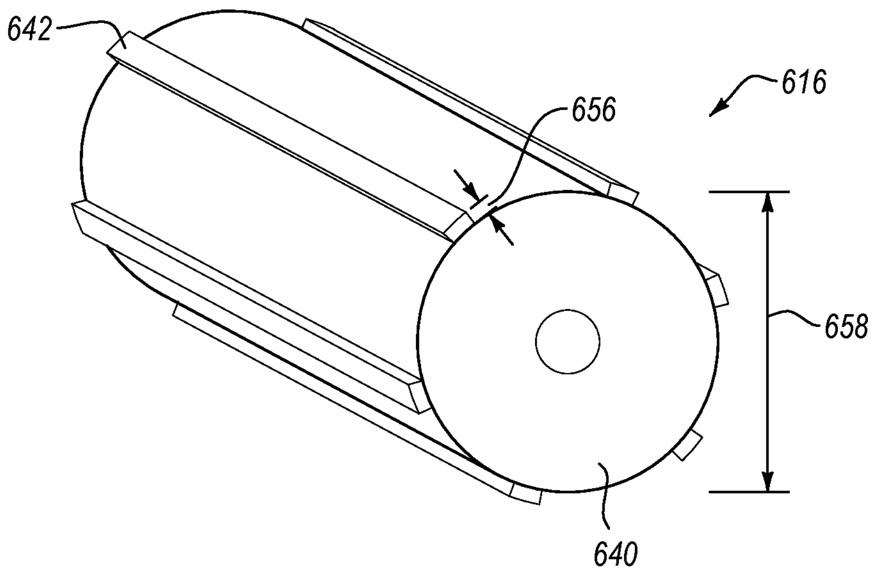
FIG. 10 is a perspective view of yet another embodiment of a rotor, according to the present disclosure.

While rotors with duckbills are depicted in FIG. 6 through FIG. 9, other embodiments of rotors may have other types of engagement members to move material. FIG. 10 illustrates an embodiment of a rotor 616 with a body 640 and a plurality of engagement members 642. At least one of the engagement members 642 may extend across a percentage of the transverse width of the body 640 in a range having an upper value, a lower value, or upper and lower values including any of 10%, 20%, 30%, 40%, 50%, 60%, 70%, 80%, 90%, 100%, or any values therebetween. For example, at least one of the engagement members 642 may extend across at least 10% of the width of the body 640. In other examples, at least one of the engagement members 642 may extend across less than 100% of the width of the body 640. In yet other examples, at least one of the engagement members 642 may extend across the entire width of the body 640. In further examples, at least one of the engagement members 642 may extend across a percentage of the width of the body 640 in a range of 10% to 100%. In at least one example, all of the engagement members 642 may extend across the entire width of the body 640.

In some embodiments, an engagement member 642 may have a height 656 above the surface of the body 640. The height 656 of the engagement member 642 may be at least partially related to the body diameter 658. In some embodiments, the height 656 may be a percentage of the body diameter 658 in a range having an upper value, a lower value, or upper and lower values including any of 5%, 10%, 15%, 20%, 25%, 30%, 40%, 50%, 75%, 100%, or any values therebetween. For example, the height 656 may be greater than 5% of the body diameter 658. In other examples, the height 656 may be less than 100% of the body diameter 658. In yet other examples, the height 656 may be in a range of 5% to 100% of the body diameter 658.

In some embodiments, the body diameter 658 may be in a range having an upper value, a lower value, or upper and lower values including any of 1.0 feet, 1.25 feet, 1.5 feet, 1.75 feet, 2.0 feet, 2.25 feet, 2.5 feet, 2.75 feet, 3.0 feet, 3.25 feet, 3.5 feet, 3.75 feet, 4.0 feet, or any values therebetween. For example, the body diameter 658 may be greater than 1.0 feet. In other examples, the body diameter 658 may be less than 4.0 feet. In yet other examples, the body diameter 658 may be in a range of 1.0 feet to 4.0 feet. In further examples, the body diameter 658 may be in a range of 2.0 feet to 3.5 feet.

In some embodiments, the rotor is height adjustable. For example, as depicted in FIG. 9B, the rotor 516-2 is adjustable along angular track 560 relative to stationary rotor 516-1. In some embodiments, the relative height difference between the first rotor 516-1 and the second rotor 516-2 is adjusted by the user. It should be appreciated that the height of the rotor may affect the amount or type of material conveyed to the padding machine 100 for separation and conveyance. For example, one or a plurality of rotors may be positioned at ground level, above ground level, and/or below ground level to accommodate a user's preference or objective in the amount and/or type of material to be engaged by the padding machine.

Figure 11:
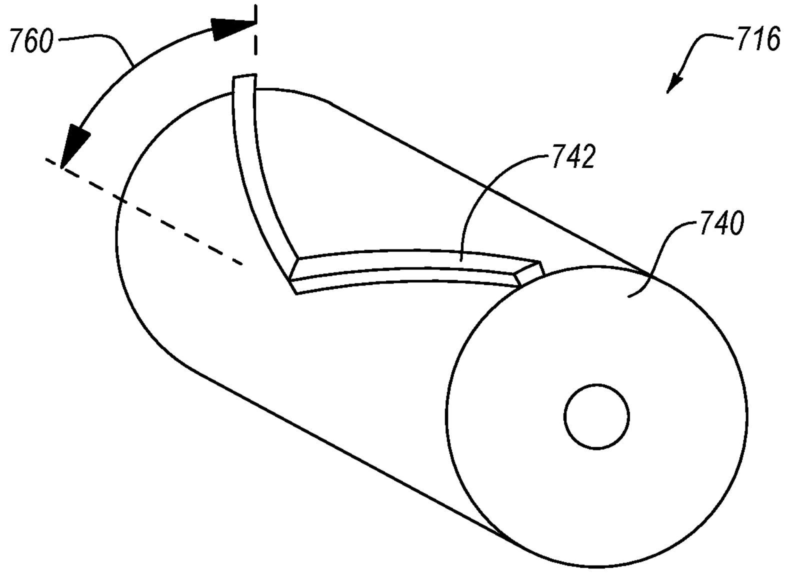
FIG. 11 is a perspective view of a further embodiment of a rotor, according to the present disclosure.

Referring now to FIG. 11, in some embodiments, a rotor 716 may have an engagement member 742 that is curved and/or includes a discontinuous angle. For example, the engagement member 742 may be positioned on body 740 such that the engagement member has a rotational length 760 that curves around an angular portion of the body circumference. For example, the engagement member 742 may have a rotational length 760 in a range having an upper value, a lower value, or upper and lower values including any of 1°, 5°, 10°, 20°, 30°, 40°, 50°, 60°, 70°, 80°, 90°, 120°, 180°, or any values therebetween. For example, the engagement member 742 may have a rotational length 760 greater than 1°. In other examples, the engagement member 742 may have a rotational length 760 less than 180°. In yet other examples, the engagement member 742 may have a rotational length 760 in a range of 1° to 180°.

In some embodiments, a graded material conveyor and an oversize material conveyor may be oriented at different angles relative to one another from an overhead perspective. In other words, the graded material conveyor and the oversize material conveyor may be oriented to discharge the first portion of the material and the second portion of the material, respectively, at an angle to one another.

Figure 12:
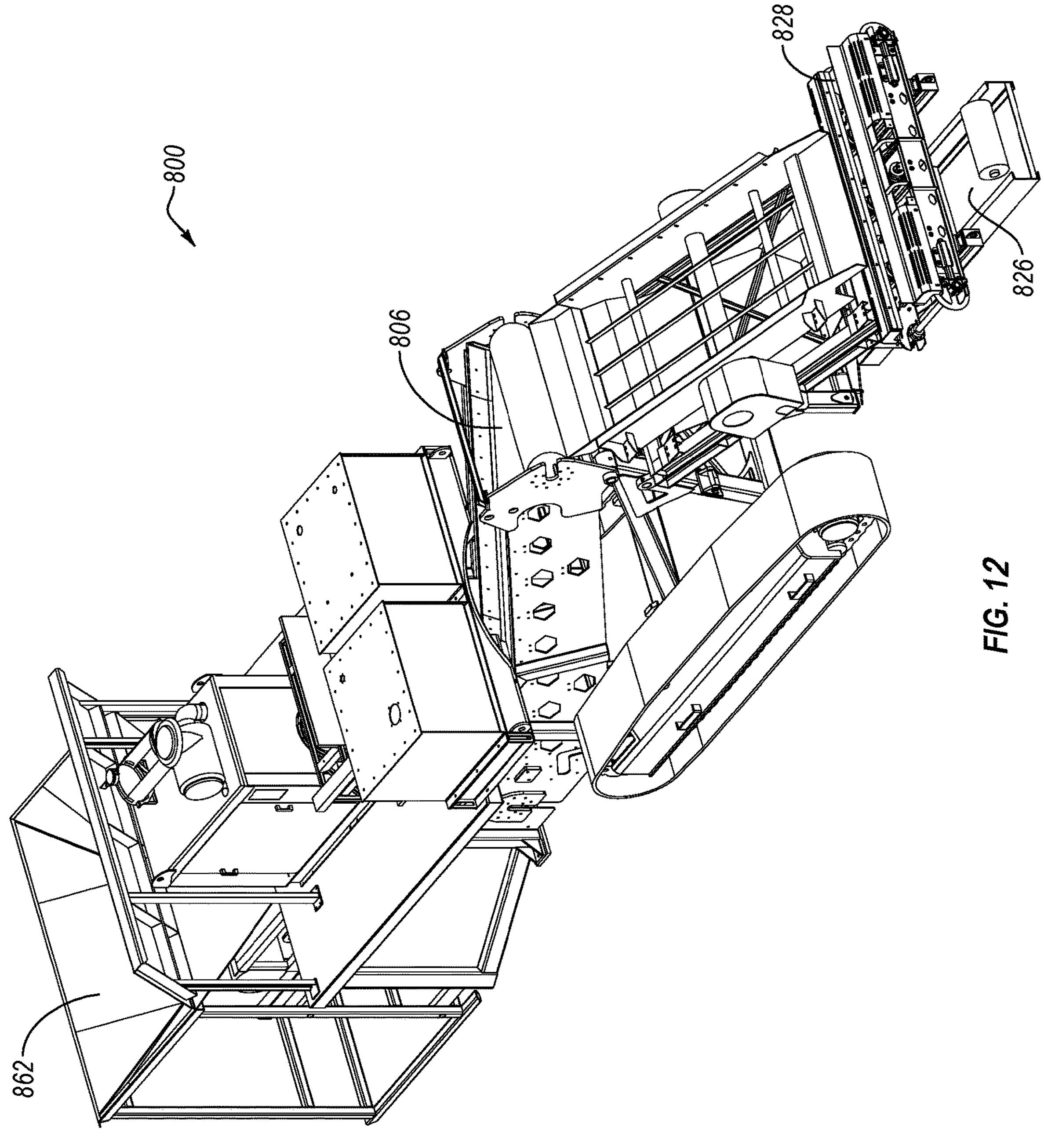
FIG. 12 is a perspective view of another embodiment of a padding machine, according to the present disclosure.
Figure 13:
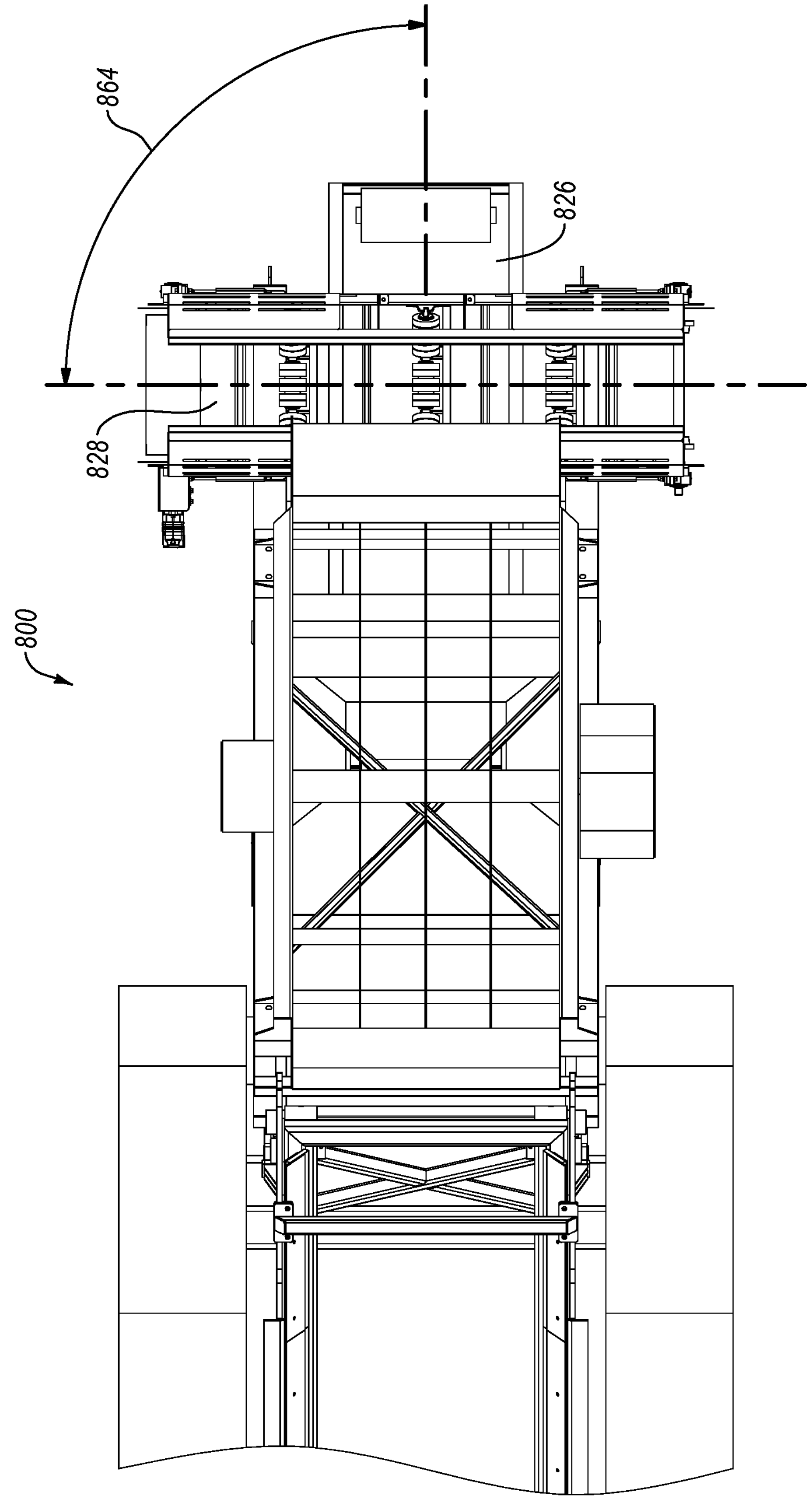
FIG. 13 is a top view of the embodiment of a padding machine of FIG. 12, according to the present disclosure.

FIGS. 12 and 13 illustrate another embodiment of a padding machine 800 with a graded material conveyor 826 oriented to convey a first portion of the material in a direction that is similar to a main conveyor belt 806. For example, the padding machine 800 may straddle a trench and material may be provided to the padding machine 800 through a top-loading feeder 862. A first portion of the material may be discharged into the trench below the padding machine 800 by the graded material conveyor 826. The padding machine 800 may have an oversize material conveyor 828 that is oriented in a lateral direction to the main conveyor belt 806 to discharge the second portion of the material to the side of the padding machine 800.

While FIGS. 13 and 13 illustrate a padding machine with the graded material conveyor 826 and the oversize material conveyor 828 oriented substantially perpendicularly to one another, it should be understood that other embodiments may have the graded material conveyor 826 and the oversize material conveyor 828 oriented at any conveyor angle 864 relative to one another. For instance, in some embodiments, a conveyor angle 864 (e.g., the angle between the graded material conveyor 826 and the oversize material conveyor 828) may be in a range having an upper value, a lower value, or upper and lower values including any of 1°, 5°, 10°, 20°, 30°, 40°, 50°, 60°, 70°, 80°, 90°, or any values therebetween. For example, the conveyor angle 864 may be greater than 1°. In other examples, the conveyor angle 864 less than 90°. In yet other examples, the conveyor angle 864 may be in a range of 1° to 90°. In at least one embodiment, the conveyor angle 864 may be adjustable by rotating the graded material conveyor 826 and/or the oversize material conveyor 828 relative to one another.

In at least one embodiment, a padding machine according to the present disclosure may allow for the conveyance and/or separation of a wider variety of material more efficiently. For example, a padding machine with a rotor as described herein may be capable of picking up and moving larger debris without damaging the padding machine and/or compromising the padding machine operations. A padding machine with a flexible main conveyor belt may have a longer operation lifetime with lower maintenance costs. A padding machine with an oversize material conveyor as described herein may convey and sort the separated material into windrows that are more easily and/or efficiently collected subsequently, speeding overall construction practices.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Where ranges are described in combination with a set of potential lower or upper values, each value may be used in an open-ended range (e.g., at least 50%, up to 50%), as a single value, or two values may be combined to define a range (e.g., between 50% and 75%). Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

I claim:

1. A mobile device for sorting particulate material, comprising:

a main conveyor belt;

a separation screen configured to receive material from the main conveyor belt and separate the material into an oversize portion and a graded portion having an average particle size that is less than the oversize portion;

a graded material conveyor positioned below the separation screen and configured to receive the graded portion of the material, wherein the graded material conveyor is oriented in substantially the same direction as the main conveyor belt to deposit the graded portion directly behind the mobile device;

an oversize material conveyor positioned at an end of the separation screen and configured to receive the oversize portion of the material and deposit the oversize portion of the material to a lateral side of the mobile device; and a motive element configured to move the device relative to a surface on which the device is used.

2. The device of claim 1, wherein the graded material conveyor is oriented to deposit the graded portion of the material into a trench below the mobile device.

3. The device of claim 1, wherein the oversize material conveyor is oriented transverse to the main conveyor belt.

4. The device of claim 2, wherein the oversize material conveyor is oriented to deposit the oversize portion of the material to a lateral side of the trench below the mobile device.

5. The device of claim 1, wherein the motive element includes one or more tracks for moving the device relative to the surface.

6. The device of claim 1, wherein the motive element is configured to operate over a trench, and wherein the motive element is configured to move the device over the trench.

7. The device of claim 6, further comprising a top loading feeder configured to receive a supply of the material as the mobile device is moved by the motive element over the trench and for providing the supply of the material to the main conveyor belt as the mobile device is moved by the motive element over.

8. The device of claim 6, wherein the oversize material conveyor is oriented to deposit the oversize portion of the material to a lateral side of the trench as motive element moves the mobile device over the trench.

9. The device of claim 6, wherein the motive element includes at least two tracks, and wherein the at least two tracks are positioned on different lateral sides of the device such that the at least two tracks straddle the trench.

10. A padding machine for sorting particulate material, comprising:

a main conveyor belt;

a motive element configured to move the padding machine relative to a surface on which the padding machine is used;

a top-loading feeder for receiving a material as the padding machine is moved by the motive element and for providing the material to the main conveyor belt as the padding machine is moved by the motive element;

a separation screen configured to receive the material from the main conveyor belt and separate the material into an oversize portion and a graded portion having an average particle size that is less than the oversize portion;

a graded material conveyor positioned below the separation screen and configured to receive the graded portion of the material and oriented to deposit the graded portion directly behind the padding machine; and an oversize material conveyor positioned at an end of the separation screen, configured to receive the oversize portion of the material, and oriented to deposit the oversize portion to a lateral side of the padding machine.

11. The padding machine of claim 10, wherein the top-loading feeder is positioned at a front side of the padding machine relative to a direction of motion of the padding machine.

12. The padding machine of claim 10, further comprising a mouth including a rotor assembly, wherein the top-loading feeder is connected to the mouth for providing the material to the main conveyor belt via the mouth.

13. The padding machine of claim 12, wherein the top-loading feeder includes a material inlet at a top of the top-loading feeder to enable the padding machine to receive the material to the top-loading feeder while the motive element moves the padding machine over a trench.

14. The padding machine of claim 12, wherein the padding machine is not configured to collect the material from the surface.

15. The padding machine of claim 12, wherein the top-loading feeder is configured to receive the material to the padding machine from an additional piece of equipment.

16. A method for separating material, comprising:

moving a padding machine over a trench under the padding machine;

receiving the material onto a main conveyor on the padding machine;

separating the material into a graded portion and an oversize portion using a vibrating screen;

receiving the graded portion on a graded material conveyor positioned below the vibrating screen;

depositing the graded portion directly behind the padding machine into the trench under the padding machine including conveying the graded portion on the graded material conveyor in substantially the same direction as the main conveyor;

receiving the oversize portion on an oversize material conveyor positioned at an end of the vibrating screen; and depositing the oversize portion to a lateral side of the padding machine and of the trench under the padding machine, including conveying the oversize portion away from the vibrating screen in a direction transverse to the main conveyor.

17. The method of claim 16, wherein receiving includes receiving the material with a top-loading feeder and providing the material to the main conveyor with the top-loading feeder.

18. The method of claim 17, wherein receiving the material with a top-loading feeder includes receiving the material from an additional piece of equipment.

19. The method of claim 18, further comprising providing the material to the top-loading feeder with the additional piece of equipment.

20. The method of claim 16, wherein the graded portion has an average particle size that is less than the oversize portion.

* * * * *